(12) United States Patent
Ben Zaghden

(10) Patent No.: US 12,365,244 B2
(45) Date of Patent: Jul. 22, 2025

(54) VEHICLE DISPLAY ASSEMBLY

(71) Applicant: FAURECIA INTERIEUR INDUSTRIE, Nanterre (FR)

(72) Inventor: Aymen Ben Zaghden, Meru (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 253 days.

(21) Appl. No.: 18/154,807

(22) Filed: Jan. 14, 2023

(65) Prior Publication Data
US 2023/0226912 A1    Jul. 20, 2023

(30) Foreign Application Priority Data

Jan. 14, 2022 (FR) ..................... 22 00295

(51) Int. Cl.
*B60K 35/00*    (2024.01)
*B60K 35/10*    (2024.01)
(Continued)

(52) U.S. Cl.
CPC .............. *B60K 35/00* (2013.01); *B60K 35/10* (2024.01); *B60K 35/22* (2024.01); *B60K 35/53* (2024.01); *B60K 2360/1438* (2024.01)

(58) Field of Classification Search
CPC ........ B60K 35/00; B60K 35/10; B60K 35/22; B60K 35/53; B60K 2360/1438; B60K 35/60; B60R 2011/0045; B60R 11/0235; B60R 2011/0085; B60R 2011/0092; B60R 11/0229; B60R 2011/0005; B60R 2011/0012

See application file for complete search history.

(56) References Cited

U.S. PATENT DOCUMENTS 6,354,649 B1 * 3/2002 Lee .................. B60K 35/10
                                                    296/70
7,201,420 B2 * 4/2007 Vican ................ B60R 11/0235
                                                    348/837
(Continued)

FOREIGN PATENT DOCUMENTS

DE    102006011960 A1    11/2006
DE    102014221092 B4    4/2016
(Continued)

OTHER PUBLICATIONS

French Search Report for application No. FR 2200295, dated Aug. 4, 2022, 2 pages.

*Primary Examiner* — Richard M Camby
(74) *Attorney, Agent, or Firm* — Reising Ethington P.C.

(57) ABSTRACT

A display assembly for a vehicle, the assembly including: a trim element; a display device; and a rotational actuator for the display device. The display device is movable in rotation relative to the trim element according to a first axis of rotation between a rest position and at least a first inclined position. The display device is movable in rotation relative to the trim element according to a second axis of rotation, distinct from the first axis of rotation, between the rest position and at least a second inclined position. The rotational actuator is configured to move the display device between the rest position and the first inclined position and vice versa, or between the rest position and the second inclined position and vice versa.

17 Claims, 5 Drawing Sheets

(51) Int. Cl.
*B60K 35/22* (2024.01)
*B60K 35/53* (2024.01)

(56) References Cited

U.S. PATENT DOCUMENTS

| | | | |
|---|---|---|---|
| 8,002,179 B2* | 8/2011 | Feit | B60K 35/10 |
| | | | 235/382 |
| 8,646,824 B2* | 2/2014 | Da Costa Pito | B60R 11/02 |
| | | | 296/37.8 |
| 2004/0173714 A1* | 9/2004 | Nakamura | B60R 11/0235 |
| | | | 248/27.1 |
| 2006/0262033 A1* | 11/2006 | Shen | B60R 11/0235 |
| | | | 345/1.1 |

FOREIGN PATENT DOCUMENTS

| | | |
|---|---|---|
| DE | 102015011377 B4 | 3/2017 |
| WO | 2009095992 A1 | 8/2009 |
| WO | 2020207530 A1 | 10/2020 |

* cited by examiner

VEHICLE DISPLAY ASSEMBLY

TECHNICAL FIELD

The present invention relates to a display assembly for a vehicle.

BACKGROUND

Such a display assembly comprises a display device presenting many functionalities for the driver, the passengers or both the driver and the passengers. For example, the display device can display information related to the driving of the vehicle such as the speed of the vehicle, the distance traveled, geolocation information from a satellite guidance system, an image provided by a rearview camera, etc. The display device is, for example, touch-sensitive and thus forms a control interface for setting the on-board functions. The display device can for example be used by the passengers as a multimedia display device for viewing audiovisual content, surfing the Internet or as a workstation or by the driver during stop phases and/or in the case of autonomous vehicles, during driving phases not requiring the driver to control the vehicle.

Generally, this type of display device is attached to a vehicle trim element, such as a dashboard, a seat trim, etc. As a result, according to the user (driver and/or passengers) and according to the functionality of the display device, the ergonomics and more particularly the human machine interaction, especially the visibility of the display surface, are not optimal.

SUMMARY

An object of the invention is to overcome these drawbacks by proposing a simple, inexpensive display assembly, well integrated into the passenger compartment, allowing to improve and facilitate the human-machine interaction inside the vehicle according to the considered display device functionalities.

To this end, the invention relates to a display assembly for a vehicle comprising
- a trim element,
- a display device comprising a front surface and a rear surface opposite the front surface, the front surface comprising a display surface, the display device being movable in rotation relative to the trim element according to a first axis of rotation between a rest position in which the display surface extends substantially in a first plane and at least a first inclined position in which the display surface extends substantially in a second plane forming a non-zero first inclined angle with the first plane, the display device being movable in rotation relative to the trim element according to a second axis of rotation, distinct from the first axis of rotation, between the rest position and at least a second inclined position in which the display surface extends substantially in a third plane forming a second non-zero inclined angle with the first plane, the second axis of rotation being substantially parallel to the first axis of rotation, and
- a rotational actuator for rotating the display device configured to move the display device between the rest position and the first inclined position and vice versa, or between the rest position and the second inclined position and vice versa.

Thus, the display device allows the display surface to be oriented in a preferred direction, such as towards a passenger or towards a driver. Visibility of the display device is improved for the passenger and driver, and interaction of the passenger and driver with the display device is facilitated. According to the information displayed on the display device and the functionality of the device used, it is then possible to simply configure the display device in a position in which the display surface is visible to all, driver and passengers, and in inclined positions in which the display surface is visible only to the driver or a passenger.

According to different embodiments, the display assembly further comprises one or more of the following features, taken alone or in any combination:
- the rotational actuator comprises a first arm and a second arm arranged facing the rear surface, the first arm and the second arm being movable in translation relative to the trim element respectively according to a first direction and a second direction, the first direction and the second direction being substantially perpendicular to the first axis of rotation and the second axis of rotation, the rotational actuator further comprising a displacement system for the first arm and the second arm configured to move the first arm and/or the second arm in translation according to the first direction and the second direction, respectively;
- the displacement system is mechanically linked to the first arm and uncoupled from the second arm when moving from the rest position to the first inclined position and is mechanically linked to the second arm and uncoupled from the first arm when moving from the rest position to the first inclined position;
- the first arm and the second arm are fixed to the rear surface of the display device;
- the first axis of rotation extends substantially according to a first edge of the display device and the second axis of rotation extends according to a second edge of the display device, arranged opposite the first edge;
- both the first arm and the second arm are movable in translation between at least one extended position and one retracted position, the first arm and the second arm each being in the retracted position in the rest position of the display device, the first arm being in the extended position in the first inclined position of the display device, the second arm being in the extended position in the second inclined position of the display device;
- the displacement system comprises a worm drive extending according to an axis substantially perpendicular to the first direction and to the second direction, the worm drive being movable in rotation about the axis relative to the trim element, the worm drive being configured to move the first arm and/or the second arm in translation;
- the displacement system for moving the first arm and the second arm further comprises:
- a first gear and a second gear, said first and second gears being driven in rotation by the worm drive about a first gear axis and a second gear axis respectively,
- a first lever fixed to the first gear and movable in rotation about the first gear axis and a second lever fixed to the second gear and movable in rotation about the second gear axis
- the first lever and the second lever being configured to move in translation the first arm and the second arm respectively;
- the worm drive is movable in rotation according to a first direction of rotation and according to a second direction of rotation opposite to the first direction;

in the rest position, the first lever and the second lever are arranged facing each other;

the movement system further comprises a first cam mounted on the first arm and a second cam mounted on the second arm, both the first lever and the second lever comprising a first pin and a second pin, respectively, the first pin being configured to cooperate with the first cam to move the first arm in translation, the second pin being configured to cooperate with the second cam to move the second arm in translation.

BRIEF DESCRIPTION OF THE DRAWINGS

Other aspects and advantages of the invention will become apparent from the following description, given by way of example and made with reference to the attached drawings, among which.

DETAILED DESCRIPTION

Figure 1:
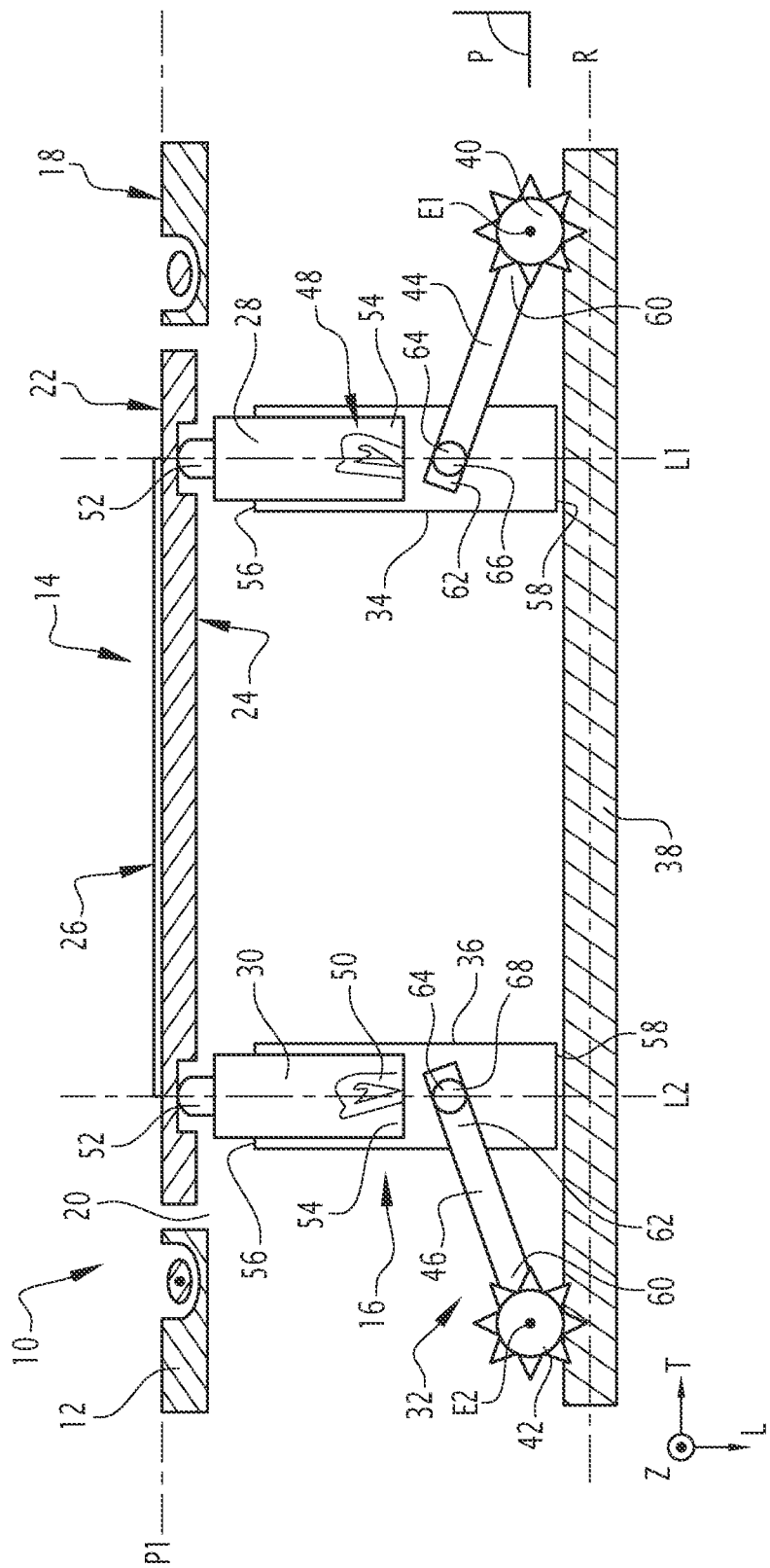
FIG. 1 is a schematic view of a display assembly according to an embodiment of the invention in the rest position.
Figure 2:
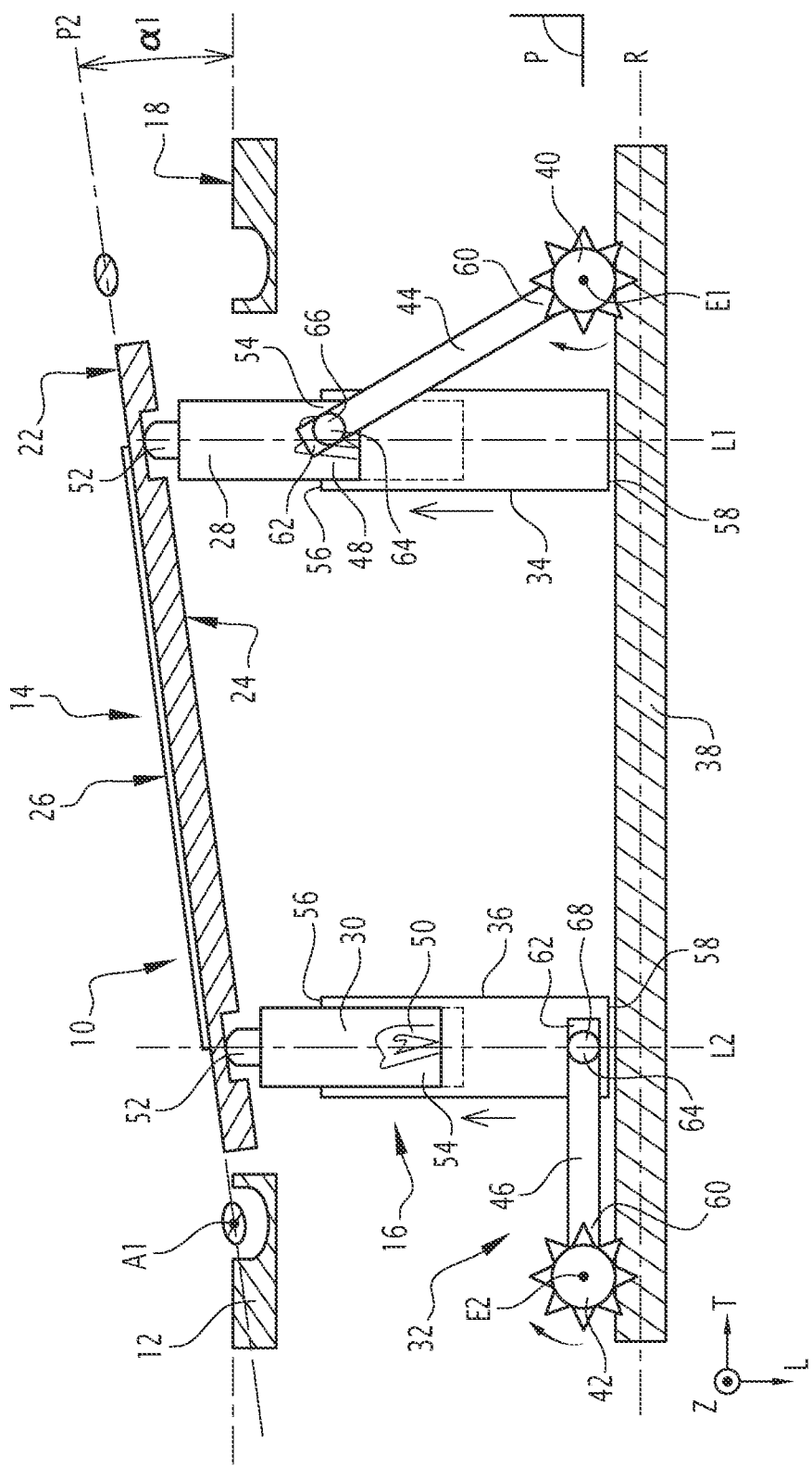
FIG. 2 is a schematic view of the display assembly of FIG. 1 in a first inclined position.
Figure 3:
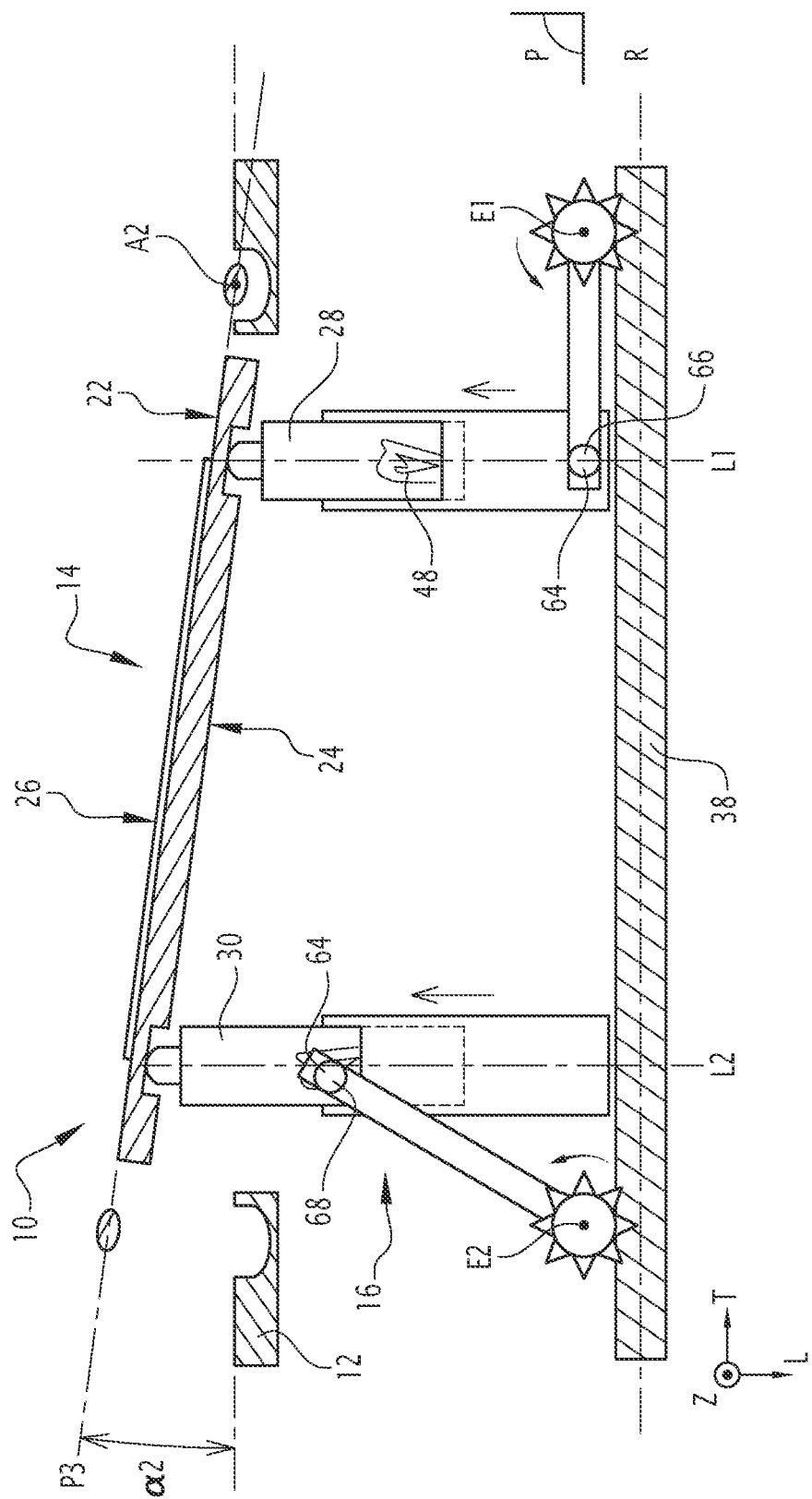
FIG. 3 is a schematic view of the display assembly of FIG. 1 in a second inclined position.

FIGS. 1 to 3 schematically represent a vehicle display assembly 10 according to an embodiment of the invention.

In the following description, the term "longitudinal" is defined with respect to the direction in which the vehicle travels. The term "transverse" defines a direction substantially perpendicular to the longitudinal direction L. The terms "left" and "right" are defined with respect to the usual direction of travel of the vehicle. The elevation direction Z is defined as a direction substantially perpendicular to the longitudinal direction L and the transverse direction T.

The display assembly 10 comprises a trim element 12, a display device 14, and a rotational actuator 16, for moving the display device 14 relative to the trim element 12.

The trim element 12 comprises an outer surface 18 facing the interior of the passenger compartment. The trim element 12 is, for example, an instrument panel extending opposite the front driver and passenger seats. It is understood that the invention may also apply to the rear seats, in which case the trim element is, for example, formed by the rear trim of one of the front seats or by a center console located between the front seats.

The trim element 18 defines, for example, an opening 20 receiving the display device 14.

The display device 14 is for example a screen.

Alternatively, the display device 14 is a control panel comprising control buttons.

Preferably, the screen is touch-sensitive, that is, a user can control the display device 14 by directly touching the display device 14. For this purpose, the display device 14 comprises, for example, a capacitive film covering the screen.

The display device 14 comprises a front surface 22 and a rear surface 24 opposite the front surface 22. The front surface 22 includes a display surface 26.

The front surface 22 and the display surface 26 face the interior of the vehicle.

The display device 14 is movable in rotation relative to the trim element 12 according to a first axis of rotation A1 between a rest position (FIG. 1) and at least a first inclined position (FIG. 2).

In the rest position, the display surface 26 extends substantially in a first plane P1, for example, substantially parallel to the transverse direction T.

For example, the display surface 26 is flat. Alternatively, the display surface 26 is curved. It is understood here that, in the case of a curved display surface, the first plane P1 corresponds to a plane at a tangent to the display surface 26, preferably tangential to the center of the display surface 26.

In the first inclined position (FIG. 2), the display surface 26 extends substantially in a second plane P2 forming a non-zero first inclined angle $\alpha_1$ with the first plane. For example, the first inclined angle $\alpha_1$ is less than 12°.

The display device 14 is further movable in rotation relative to the trim element 12 according to a second axis of rotation A2 between the rest position (FIG. 1) and at least a second inclined position (FIG. 3).

In the second inclined position, the display surface 26 extends substantially in a third plane P3 forming a non-zero second inclined angle of inclination $\alpha_2$ with the first plane. For example, the second inclined angle $\alpha_2$ is less than 12°.

The second axis of rotation A2 is distinct from the first axis of rotation A1 and is substantially parallel to the first axis of rotation A1.

It is understood that the first rotational movement according to the first axis of rotation A1 and the second rotational movement according to the second axis of rotation A2 are independent movements, that is, the display device 14 rotates either according to the first axis of rotation A1 or according to the second axis of rotation A2 each time from the rest position to the first inclined position and the second inclined position, respectively.

Preferably, the first axis of rotation A1 extends substantially according to a first edge of the display device 14 and the second axis of rotation A2 extends according to a second edge of the display device 14, arranged opposite the first edge.

The first axis of rotation A1 and the second axis of rotation A2 extend, for example, in directions substantially parallel to the direction of elevation Z.

The rotational actuator 16 of the display device 14 is configured to move the display device 14 between the rest position and the first inclined position and vice versa, or between the rest position and the second inclined position, and vice versa.

Preferably, the rotational actuator 16 comprises a first arm 28 and a second arm 30, and a displacement system 32 of the first arm 28 and the second arm 30 configured to move in translation the first arm 28 or the second arm 30. In the illustrated example, the displacement system 32 further comprises a first guide element 34 and a second guide element 36 for moving in translation the first arm 28 and the second arm 30, respectively.

The displacement system 32 is mechanically linked to the first arm 28 and uncoupled from the second arm 30 when moving from the rest position to the first inclined position and is mechanically linked to the second arm 30 and uncoupled from the first arm 28 when moving from the rest position to the first inclined position.

Preferably, the displacement system 32 further comprises a worm drive 38, a first gear 40 and a second gear 42 cooperating with the worm drive 38, a first lever 44 and a second lever 46 integral with the first gear 40 and the second gear 42, respectively, a first cam 48 mounted on the first arm 28 and a second cam 50 mounted on the second arm 30.

The first arm 28 and the second arm 30 each extend primarily according to a first direction L1 and a second direction L2, respectively.

The first arm 28 and the second arm 30 are arranged opposite the rear surface 24 of the display device 14. More particularly, each of the arms 28, 30 comprises a front end 52 facing the rear surface 24 of the display device 14 and a rear end 54 opposite the front end 52.

In the illustrated example, the first arm 28 and the second arm 30 are attached to the rear surface 24, for example by means of a ball-and-socket connection or a hinge. In other words, the front end 52 of each of the arms 28, 30 is attached to the rear surface 24 of the display device 14.

Alternatively, the first arm 28 and the second arm 30 are rigidly attached to the rear surface 24 of the display device 14.

For example, the rear surface 24 of the display device 14 defines a first recess and a second recess respectively receiving the front end 52 of the first arm 28 and the front end of the second arm 30.

Each of the first guide member 34 and second guide member 36 defines a slot receiving the first arm 28 and the second arm 30, respectively. Each guide member 34, 36 comprises a front end 56 and a rear end 58, opposite the front end 56. The front end 56 oriented toward the rear surface 24 of the display device 14.

The first arm 28 and the second arm 30 are movable in translation relative to the trim element 12, and in particular relative to the first guide element 34 and the second guide element 36, respectively, according to the first direction L1 and the second direction L2. The first direction L1 and the second direction L2 are substantially perpendicular to the first axis of rotation A1 and the second axis of rotation A2. For example, the first direction L1 and the second direction L2 are substantially parallel to the longitudinal direction L.

Both the first arm 28 and the second arm 30 are movable in translation according to the first direction L1 and the second direction L2, respectively, between at least an extended position and a retracted position.

In particular, for each of the arms 28, 30, a distance between the front end 52 of the arm 28, 30 and the front end 56 of the guide element 34, 36 is greater in the extended position than that same distance in the retracted position.

Preferably, in the extended position, the front end 52 of the arm 28, 30 extends outwardly from the first plane P1.

The first arm 28 and the second arm 30 are each in the retracted position in the rest position of the display device 14.

The first arm 28 is in the extended position in the first inclined position of the display device 14 (FIG. 2). The second arm 30 is in the extended position in the second inclined position of the display device 14 (FIG. 3).

Both the first arm 28 and the second arm 30 are further movable in translation to an intermediate position between the retracted position and the extended position. In the intermediate position, the distance between the front end 52 of the arm 28, 30 and the front end 56 of the corresponding guide element 34, 36 is between that same distance in the retracted position and that same distance in the extended position.

Preferably, the second arm 30 is in the intermediate position in the first inclined position (FIG. 2) and the first arm 28 is in the intermediate position in the second inclined position (FIG. 3). Indeed, in the embodiment in which the first arm 28 and the second arm 30 are attached to the rear surface 24 of the display device 14, movement of the first arm 28 to the extended position causes the second arm 30 to move passively to the intermediate position. Similarly, movement of the second arm 30 to the extended position by the rotational actuator 16 causes the first arm 28 to move passively to the intermediate position.

The worm drive 38 extends primarily according to an axis R substantially perpendicular to the first direction L1 and the second direction L2. The worm drive 38 is configured to move in translation the first arm 28 or the second arm 30.

The worm drive 38 is movable in rotation about the axis R relative to the trim element 12. Preferably, the worm drive 38 is movable in rotation in a first direction and in a second direction opposite the first direction.

The display assembly 10 includes a motor (not shown) connected to one end of the worm drive 38 and configured to move in rotation the worm drive 38 according to the first direction or the second direction.

Each of the first and second gears 40, 42 is moved in rotation relative to the trim element 12 by the worm drive 38 about a first gear axis E1 and a second gear axis E2, respectively. The first gear axis E1 and the second gear axis E2 are substantially perpendicular to the axis R.

Each of the first lever 44 and the second lever 46 extends according to a direction substantially radial to the first gear axis E1 and the second gear axis E2, respectively. Each of the levers 44, 46 is moved in rotation by the rotational movement of the corresponding gear 40, 42.

In the rest position, the first lever 44 and the second lever 46 are arranged opposite each other. Preferably, the first lever 44 and the second lever 46 are arranged symmetrically relative to a plane substantially perpendicular to the axis R.

Each of the levers 44, 46 comprises a first end 60 fixed to the corresponding gear 40, 42 and a free second end 62 opposite the first end 60.

Each of the second ends 62 comprises a pin 64. Thus, in the illustrated embodiment, the second end 62 of the first lever 44 comprises a first pin 66 and the second end 62 of the second lever 46 comprises a second pin 68.

Each of the first pin 66 and second pin 68 is configured to cooperate with the first cam 48 and second cam 50, respectively, to move in translation the first arm 28 and second arm 30, respectively.

Each of the cams 48, 50 extends in a same plane P substantially parallel to the first direction L1 and to the second direction L2. Each of the cams 48, 50 is movable only in the plane P. In other words, each cam 48, 50 presents a single degree of freedom of movement in the plane P.

Each of the cams 48, 50 is driven by the pin 66, 68 of the corresponding lever 44, 46 in the plane P during the rotation of the lever 44, 46.

Figure 4:
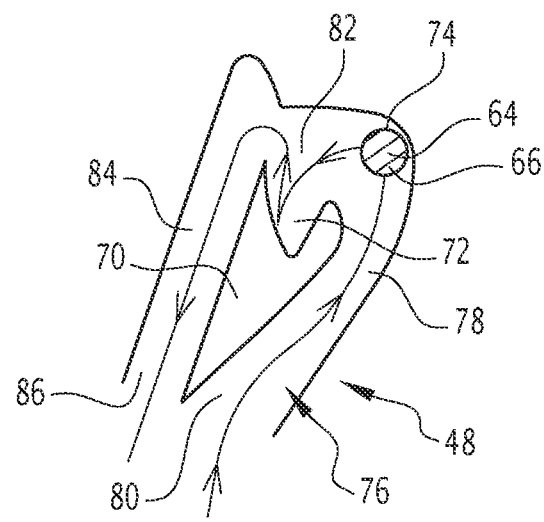
FIG. 4 is a detailed schematic view of a portion of the rotational actuator of the display assembly of FIG. 1 during movement of the display assembly from the rest position to an inclined position.
Figure 5:
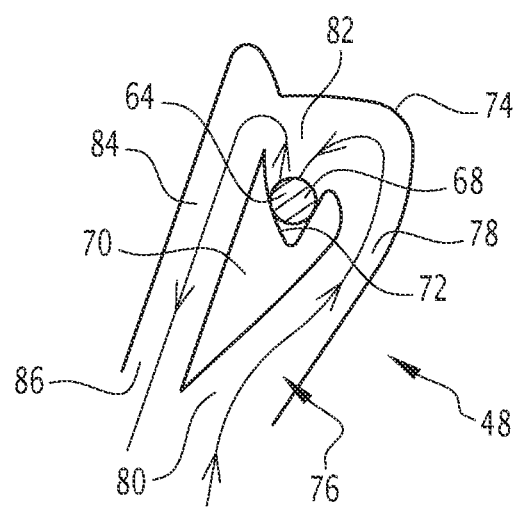
FIG. 5 is a detailed schematic view of a portion of the rotational actuator of the display assembly of FIG. 1 when moving from the inclined position to the rest position.

Each cam 48, 50 comprises a central element 70 defining a notch 72, and a front stop 74 arranged substantially opposite the notch 72 (FIGS. 4 and 5).

Each pin 66, 68 is movable between an abutment position (FIG. 4) in which the pin 66, 68 presses against the front stop 74, a central position (FIG. 5) in which the pin 66, 68 is received in the notch 72, and a rest position in which the pin 66, 68 is away from the cam 48, 50.

In particular, each cam 48, 50 defines a cam track 76 followed by the pin 66, 68 of the corresponding lever 44, 46 upon rotation of the lever 44, 46 according to a first direction and upon rotation of the lever according to a second direction opposite the first direction. The cam track 76 comprises a first portion 78 that extends between a first lower opening 80 and the front stop 74, a second portion 82 connected to the first portion 78 that extends between the front stop 74 and the notch 72, and a third portion 84 connected to the second portion 82 that extends between the notch 72 and a second lower opening 86.

The operation of the display assembly 10 will now be described.

To move the display assembly 14 from the rest position (FIG. 1) toward the first inclined position (FIG. 2), the worm drive 38 is rotated about the axis R according to the first direction of rotation. The rotation of the worm drive 38 causes the first gear 40 and the second gear 42 to rotate about the first gear axis E1 and the second gear axis E2, respectively. The first gear 40 and the second gear 42 move in rotation according to the same direction of rotation. Rotation of the first gear 40 and the second gear 42 causes the first lever 44 and the second lever 46 to rotate according to the same direction of rotation. In the rest position (FIG. 1), the first lever 44 and the second lever 46 are substantially arranged facing each other. When moving the first gear 40 and the second gear 42, the first lever 44 moves forward, that is, toward the first arm 28. In contrast, the second lever 46 moves backward, that is, toward the worm drive 38. The first pin 66 enters the first cam 48 through the first lower opening 80 and travels along the first portion 78 of the cam track 76 until it presses against the front stop 74. The rotational movement of the first lever 44 then causes the first arm 28 to move in translation from the retracted position to the extended position. The movement in translation of the first arm 28 causes the display device 14 to rotate about the first axis of rotation A1. The display device 14 is then in the first inclined position (FIG. 2). The second arm 30, which is attached to the rear surface 24 of the display device 14, is passively driven in translation by the first arm 28 and is then in the intermediate position.

To move the display device 14 from the first inclined position toward the rest position, the direction of rotation of the worm drive 38 is reversed. The worm drive 38 rotates according to the second direction of rotation opposite the first direction of rotation. This causes the first gear 40, the second gear 42, the first lever 44 and the second lever 46 to move in the opposite direction. The first pin 66 moves from the stop position toward the center position by traveling along the second portion 82 of the cam track 76. The movement in rotation of the first lever 44 causes the first cam 48 to move in the plane P and causes the first arm 28 to move in translation from the extended position to the retracted position. The first pin 66 then travels along the third portion 84 of the cam track 76 until it exits through the second lower opening 86 and is away from the cam.

The display device 14 is in the rest position.

To move the display device 14 to the second inclined position (FIG. 3), the worm drive 38 continues to move in rotation according to the second direction. This movement causes the first gear 40 and the second gear 42 to rotate about the first gear axis E1 and the second gear axis E2, respectively. The first gear 40 and the second gear 42 move in rotation according to the same direction of rotation. The rotation of the first gear 40 and the second gear 42 causes the first lever 44 and the second lever 46 to rotate according to the same direction of rotation. The second lever 46 moves forward, that is, toward the second arm 30. On the contrary, the first lever 44 moves backward, that is, toward the worm drive 38. The second pin 68 enters the second cam 50 through the first lower opening 80 and travels along the first portion 78 of the cam track 76 until it comes to rest against the front stop 74. The rotational movement of the second lever 46 causes the second arm 30 to move in translation from the retracted position to the extended position. The movement in translation of the second arm 38 causes the display device 14 to rotate about the second axis of rotation A2. The display device 14 is then in the second inclined position (FIG. 3). The first arm 28, which is attached to the rear surface 24 of the display device 14, is passively driven in translation by the second arm 30 and is now in the intermediate position.

To move the display device 10 from the second inclined position toward the rest position, the direction of rotation of the worm drive 38 is reversed. The worm drive 38 rotates according to the first direction of rotation. This causes the first gear 40, the second gear 42, the first lever 44 and the second lever 46 to move in the opposite direction. The second pin 68 moves from the stop position toward the center position by traveling along the second portion 82 of the cam track 76. The second pin 68 is then in the notch 72 and the movable in rotation of the second lever 46 causes the second arm 30 to move in translation from the extended position to the retracted position. The second pin 68 then travels along the third portion 84 of the cam track 76 until it exits the second cam 50. The display device 14 is again in the rest position.

It is understood that the rotation of the worm drive 38 controls the first inclined angle and the second inclined angle of the display device 14.

Thus, the assembly described above is particularly advantageous because it allows the display surface 26 to be oriented according to a preferred direction, for example toward a passenger or toward a driver. The visibility of the display device 14 is improved for the passenger and driver, and the interaction of the passenger and driver with the display device 14 is facilitated. According to the information displayed on the display device 14 and according to the functionality of the device used, it is then possible to simply configure the display device 14 in a position in which the display surface 26 is visible to all, driver and passengers, and in inclined positions in which the display surface 26 is visible only to the driver or a passenger.

The invention claimed is:

1. A display assembly for a vehicle, the assembly comprising:
   a trim element;
   a display device comprising a front surface and a rear surface opposite the front surface, the front surface comprising a display surface, the display device being movable in rotation relative to the trim element according to a first axis of rotation between a rest position wherein the display surface extends substantially in a first plane and at least a first inclined position wherein the display surface extends substantially in a second plane forming a non-zero first inclined angle with the first plane the display device being movable in rotation relative to the trim element according to a second axis of rotation, distinct from the first axis of rotation, between the rest position and at least one second inclined position wherein the display surface extends substantially in a third plane forming a second non-zero inclined angle with the first plane, the second axis of rotation being substantially parallel to the first axis of rotation; and
   a rotational actuator for the display device configured to move the display device between the rest position and the first inclined position and vice versa, or between the rest position and the second inclined position, and vice versa;

wherein the rotational actuator comprises a first arm and a second arm arranged opposite the rear surface, the first arm and the second arm being movable in translation relative to the trim member respectively, according to a first direction and a second direction, the first direction and the second direction being substantially perpendicular to the first axis of rotation and to the second axis of rotation, the rotational actuator further comprising a displacement system for moving the first arm and the second arm configured to move in translation the first arm and/or the second arm according to the first direction and the second direction, respectively; and wherein the displacement system is mechanically linked to the first arm and uncoupled from the second arm when moving from the rest position to the first inclined position and is mechanically linked to the second arm and uncoupled from the first arm when moving from the rest position to the first inclined position.

2. The display assembly according to claim 1, wherein the first arm and the second arm are attached to the rear surface of the display device.

3. The display assembly according to claim 1, wherein the first axis of rotation extends substantially according to a first edge of the display device and the second axis of rotation extends according to a second edge of the display device, arranged opposite the first edge.

4. The display assembly according to claim 1, wherein each of the first arm and the second arm are movable in translation between at least an extended position and a retracted position, the first arm and the second arm each being in the retracted position in the rest position of the display device, the first arm being in the extended position in the first inclined position of the display device, the second arm being in the extended position in the second inclined position of the display device.

5. The display assembly according to claim 1, wherein the displacement system comprises a worm drive extending according to an axis substantially perpendicular to the first direction and the second direction, the worm drive being movable in rotation about the axis relative to the trim element, the worm drive being configured to move in translation the first arm and/or the second arm.

6. The display assembly according to claim 1, wherein the displacement system of the first arm and the second arm further comprises:
a first gear and a second gear, said first and second gears being rotated by the worm drive about a first gear axis and a second gear axis, respectively;
a first lever fixed to the first gear and movable in rotation about the first gear axis and a second lever fixed to the second gear and movable in rotation about the second gear axis;
the first lever and the second lever being configured to move in translation the first arm and the second arm, respectively.

7. The display assembly according to claim 5, wherein the worm drive is movable in rotation according to a first rotational direction and according to a second rotational direction opposite the first direction.

8. The display assembly according to claim 6, wherein in the rest position, the first lever and the second lever are arranged facing each other.

9. The display assembly according to claim 6, wherein the displacement system further comprises a first cam mounted on the first arm and a second cam mounted on the second arm, both the first lever and the second lever comprising a first pin and a second pin, respectively, the first pin being configured to cooperate with the first cam to move in translation the first arm, the second pin being configured to cooperate with the second cam to move in translation the second arm.

10. A display assembly for a vehicle, the assembly comprising:
a trim element;
a display device comprising a front surface and a rear surface opposite the front surface, the front surface comprising a display surface, the display device being movable in rotation relative to the trim element according to a first axis of rotation between a rest position wherein the display surface extends substantially in a first plane and at least a first inclined position wherein the display surface extends substantially in a second plane forming a non-zero first inclined angle with the first plane the display device being movable in rotation relative to the trim element according to a second axis of rotation, distinct from the first axis of rotation, between the rest position and at least one second inclined position wherein the display surface extends substantially in a third plane forming a second non-zero inclined angle with the first plane, the second axis of rotation being substantially parallel to the first axis of rotation; and
a rotational actuator for the display device configured to move the display device between the rest position and the first inclined position and vice versa, or between the rest position and the second inclined position, and vice versa;
wherein the rotational actuator comprises a first arm and a second arm arranged opposite the rear surface, the first arm and the second arm being movable in translation relative to the trim member respectively, according to a first direction and a second direction, the first direction and the second direction being substantially perpendicular to the first axis of rotation and to the second axis of rotation, the rotational actuator further comprising a displacement system for moving the first arm and the second arm configured to move in translation the first arm and/or the second arm according to the first direction and the second direction, respectively;
wherein the displacement system comprises a worm drive extending according to an axis substantially perpendicular to the first direction and the second direction, the worm drive being movable in rotation about the axis relative to the trim element, the worm drive being configured to move in translation the first arm and/or the second arm; and
wherein the displacement system of the first arm and the second arm further comprises:
a first gear and a second gear, said first and second gears being rotated by the worm drive about a first gear axis and a second gear axis, respectively; and
a first lever fixed to the first gear and movable in rotation about the first gear axis and a second lever fixed to the second gear and movable in rotation about the second gear axis;
the first lever and the second lever being configured to move in translation the first arm and the second arm, respectively.

11. The display assembly according to claim 10, wherein the first arm and the second arm are attached to the rear surface of the display device.

12. The display assembly according to claim 10, wherein the first axis of rotation extends substantially according to a first edge of the display device and the second axis of rotation extends according to a second edge of the display device, arranged opposite the first edge.

13. The display assembly according to claim 10, wherein each of the first arm and the second arm are movable in translation between at least an extended position and a retracted position, the first arm and the second arm each being in the retracted position in the rest position of the display device, the first arm being in the extended position in the first inclined position of the display device, the second arm being in the extended position in the second inclined position of the display device.

14. The display assembly according to claim 10, wherein the worm drive is movable in rotation according to a first rotational direction and according to a second rotational direction opposite the first direction.

15. The display assembly according to claim 10, wherein in the rest position, the first lever and the second lever are arranged facing each other.

16. The display assembly according to claim 10, wherein the displacement system further comprises a first cam mounted on the first arm and a second cam mounted on the second arm, both the first lever and the second lever comprising a first pin and a second pin, respectively, the first pin being configured to cooperate with the first cam to move in translation the first arm, the second pin being configured to cooperate with the second cam to move in translation the second arm.

17. The display assembly according to claim 10, wherein the displacement system is mechanically linked to the first arm and uncoupled from the second arm when moving from the rest position to the first inclined position and is mechanically linked to the second arm and uncoupled from the first arm when moving from the rest position to the first inclined position.

* * * * *